(12) United States Patent
Yang (10) Patent No.: US 9,323,007 B1
(45) Date of Patent: Apr. 26, 2016

(54) ONE-PIECE OPTICAL FIBER ADAPTER CAPABLE OF SWITCHING COUPLING POLARITY OF OPTICAL FIBER CONNECTORS

(71) Applicant: Muh-Chen Yang, Taipei (TW)

(72) Inventor: Muh-Chen Yang, Taipei (TW)

( * ) Notice: Subject to any disclaimer, the term of this patent is extended or adjusted under 35 U.S.C. 154(b) by 0 days.

(21) Appl. No.: 14/816,183

(22) Filed: Aug. 3, 2015

(30) Foreign Application Priority Data

Feb. 24, 2015 (TW) .............................. 104106008 A (51) Int. Cl.
*G02B 6/38* (2006.01)
(52) U.S. Cl.
CPC ............ *G02B 6/3879* (2013.01); *G02B 6/3893* (2013.01); *G02B 6/3895* (2013.01)
(58) Field of Classification Search
CPC .. G02B 6/3825; G02B 6/3897; G02B 6/3898; G02B 6/3893
USPC .............................................. 385/56–88, 147
See application file for complete search history.

(56) References Cited

U.S. PATENT DOCUMENTS

| | | | |
|---|---|---|---|
| 2014/0219614 A1* | 8/2014 | Marcouiller | G02B 6/3895 385/88 |
| 2015/0195945 A1* | 7/2015 | Anderson | G02B 6/4452 361/679.02 |
| 2015/0338582 A1* | 11/2015 | Halls | G02B 6/245 425/510 |

* cited by examiner

*Primary Examiner* — Akm Enayet Ullah
(74) *Attorney, Agent, or Firm* — Rosenberg, Klein & Lee (57) ABSTRACT

An optical fiber adapter according to the present disclosure includes a main body, at least one first stop block, at least one second stop block, two first hooks, a first mounting member and a second mounting member. The first and second stop blocks are respectively positioned on the first and second walls within the main body. The first hooks are configured to hook on to a first optical fiber connector. The first mounting member is placed within the main body through the first opening of the main body. The first mounting member includes two second hooks, at least one third hook and at least one fourth hook. The second mounting member is placed within the main body through the second opening of the main body.

11 Claims, 11 Drawing Sheets

ONE-PIECE OPTICAL FIBER ADAPTER CAPABLE OF SWITCHING COUPLING POLARITY OF OPTICAL FIBER CONNECTORS

RELATED APPLICATION

The present application is based on and claims priority to Taiwanese Application Number 104106008, filed Feb. 24, 2015, the disclosure of which is hereby incorporated by reference herein in its entirety.

BACKGROUND

1. Technical Field

The present invention relates to an optical fiber adapter, and more particularly, to a one-piece optical fiber adapter.

2. Description of the Related Art

Optical fiber connectors are an essential part of substantially all optical fiber communication systems. For instance, such connectors are used to join segments of fiber into longer lengths, to connect fiber to active devices such as radiation sources, detectors and repeaters, and to connect fiber to passive devices such as switches and attenuators. The principal function of optical fiber connectors is to hold an optical fiber such that its core is axially aligned with the optical path of the device to which the connector is mating. This way the light from one fiber is optically coupled to the optical path of the mating device.

Figure 1A:
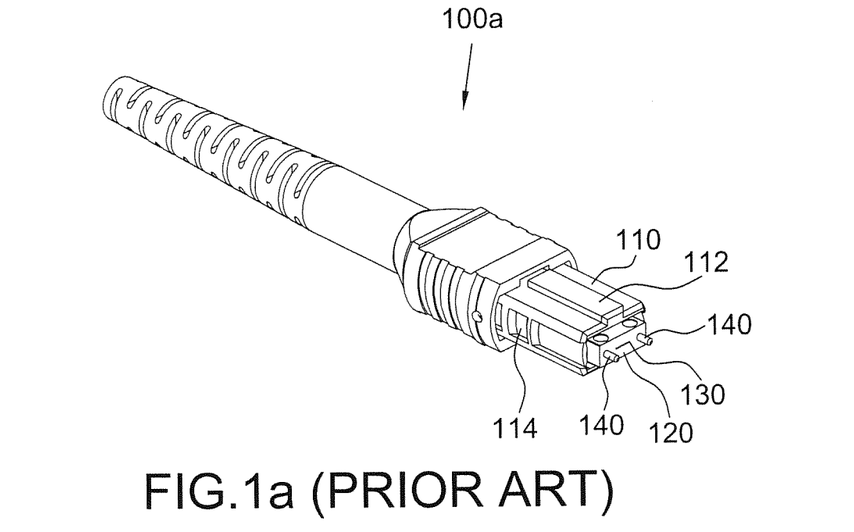
FIG. 1a is an elevated perspective view of a conventional MPO male type optical fiber adapter.
Figure 1B:
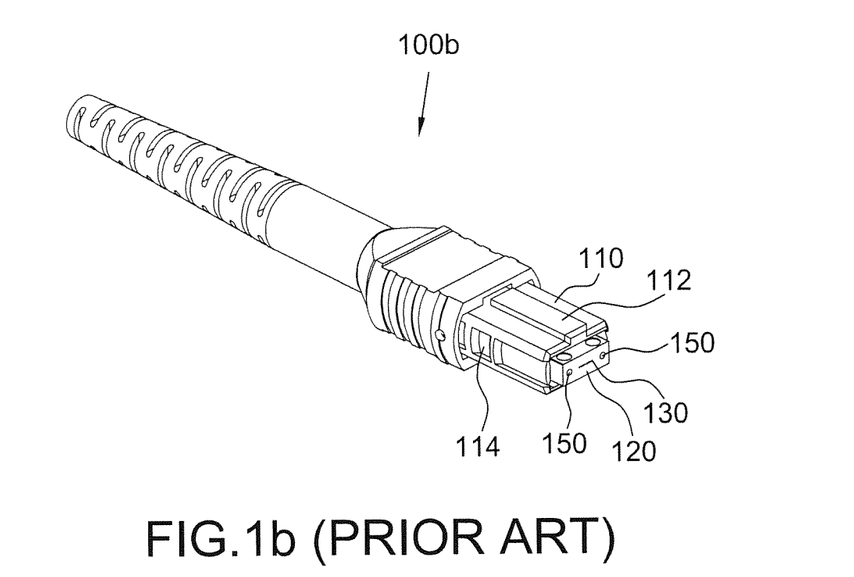
FIG. 1b is an elevated perspective view of a conventional MPO female type optical fiber adapter.

Reference is made to FIGS. 1a and 1b, which respectively illustrate conventional multi-fiber MPO male and female type connectors 110a, 110b. Each of the optical fiber connectors 100a and 100b has a rectangular key protrusion 112 formed on the upper surface of the front section thereof. Located on two opposing lateral surfaces of the front section are two indentations 114. A plurality of optical fibers 130 are exposed from and flush with the front end surface 120 of the front section. Two guide pins 140 protrude from the end surface 120 of the optical fiber connector 100a while two guide holes 150 are formed on the end surface 120 of the optical fiber connector 100b to respectively receive the guide pins 140 of the connector 100a.

Figure 2:
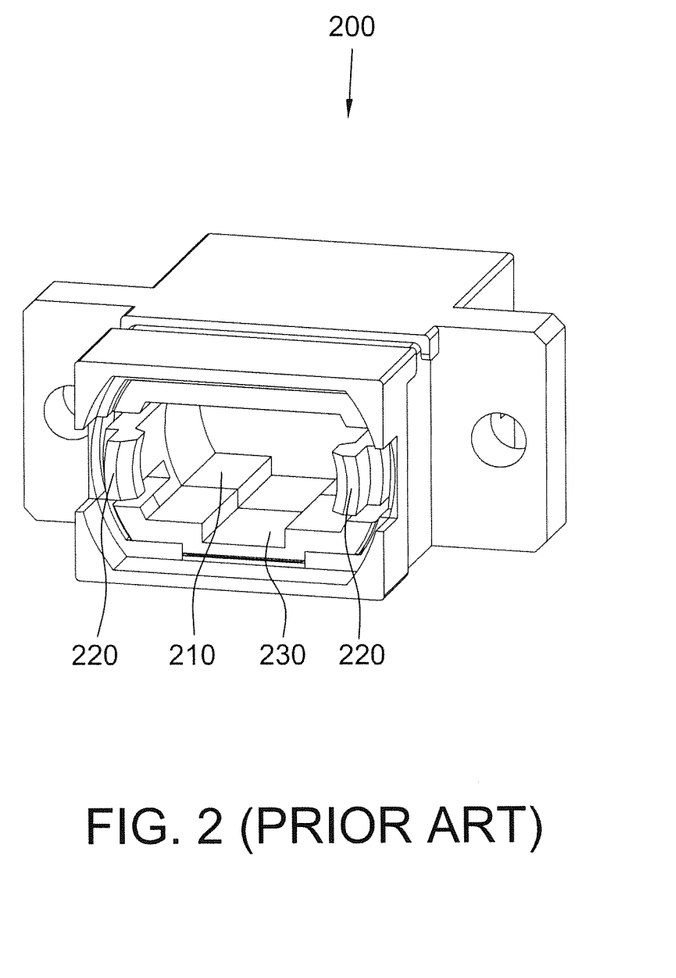
FIG. 2 is an elevated perspective view of a conventional MPO type optical fiber adapter.
Figure 3A:
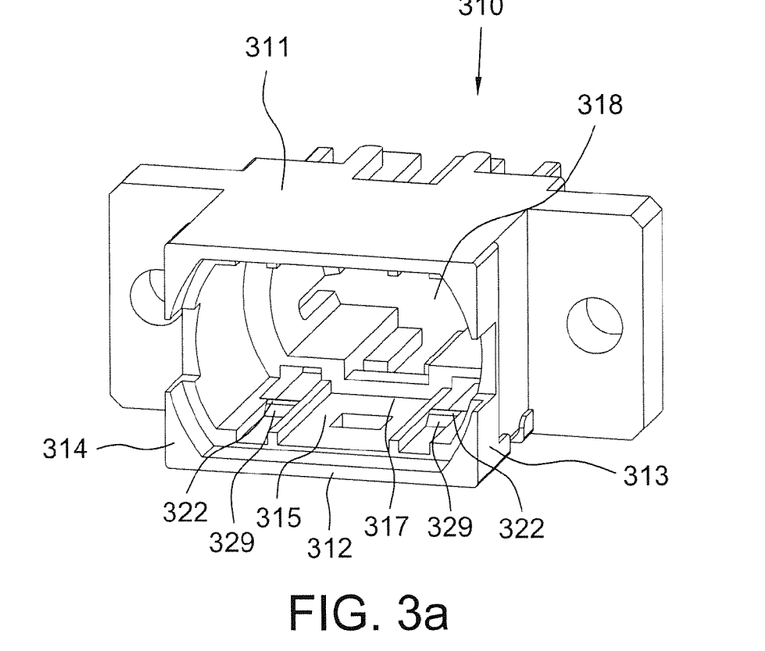
FIGS. 3a to 3d are different elevated perspective views of the main body of the optical fiber adapter of the present disclosure.
Figure 3B:
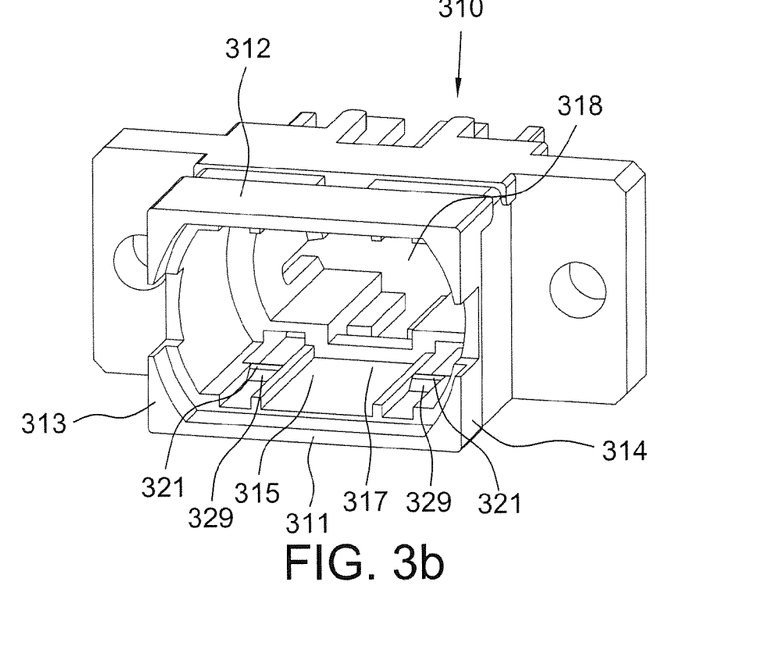
Figure 3C:
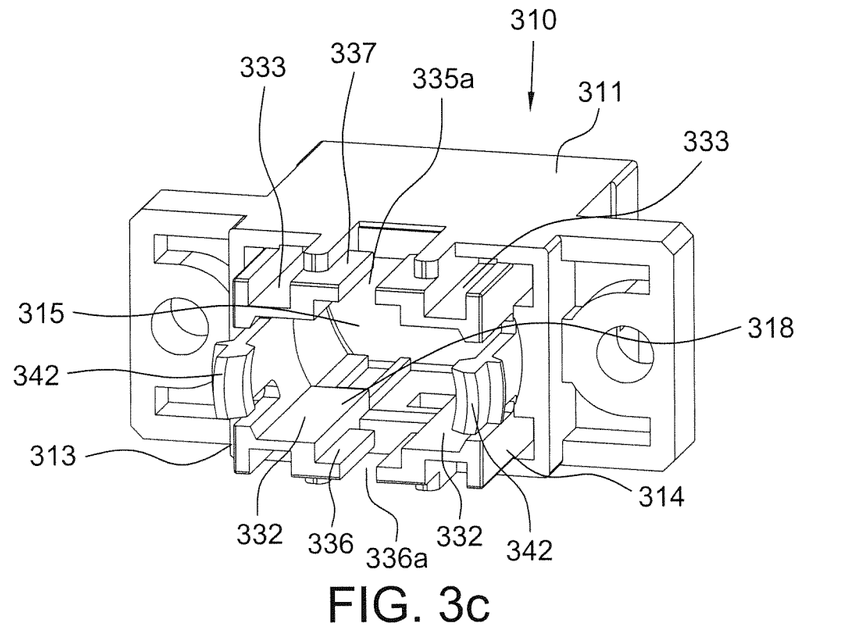
Figure 3D:
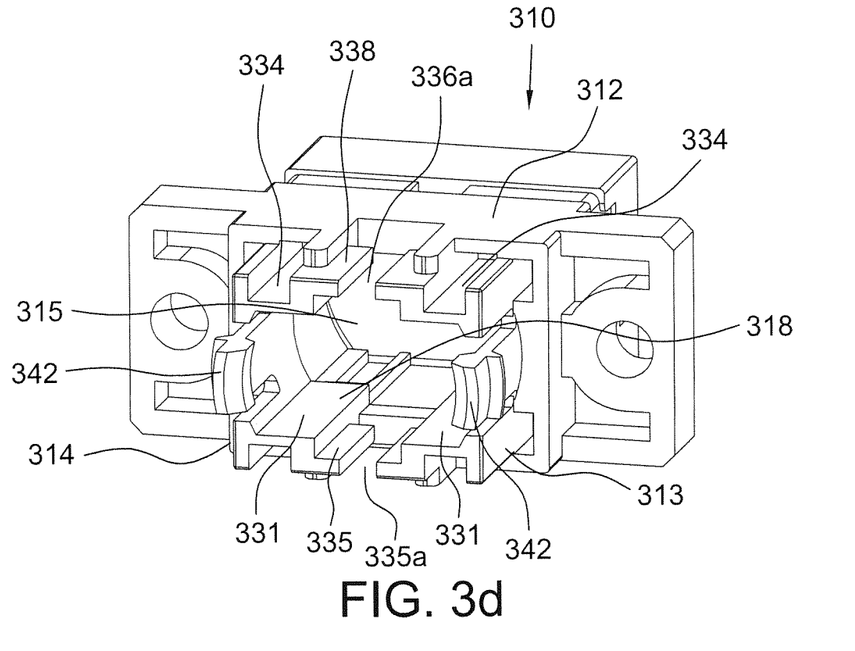

In order to couple the optical fiber connectors 100a and 100b with each other, it needs to use a corresponding optical fiber adapter. Reference is made to FIG. 2, which illustrates a conventional MPO type optical fiber adapter 200. The optical fiber adapter 200 has a hollow main body with two opposing openings 210 in an axial direction into which the connectors 100a and 100b may be respectively inserted. To firmly mate with the connectors 100a and 100b, two pairs of hooks 220 are positioned to respectively extend out from the openings 210 of the adapter 20. In addition, two rectangular indentations 230 are formed on the inner walls of the adapter 20 respectively near the openings 210 to receive the key protrusions 112 of the connectors 100a and 100b.

When the connectors 100a and 100b are respectively inserted into the adapter 200 through the openings 210 to couple with each other, the hooks 220 will respectively hook on to the connectors 100a, 100b at the indentations 114. The guide pins 140 of the connector 100a are respectively inserted into the guide holes 150 of the connector 100b and the optical fibers 130 exposed out from the connectors 100a and 100b are brought into contact with each other accordingly. This way the light from one fiber may be optically coupled to the coupled fiber.

The function of the indentations 230 is to receive the key protrusions 112 at the connectors 100a, 100b such that the connectors 100a, 100b may be inserted into the adapter 200 with only predetermined orientations. As illustrated in FIG. 2, when the connector 100a or 100b of FIGS. 1a, 1b is positioned with its key protrusion 112 being oriented up, it cannot be inserted into the adapter 200 through the openings 210. When the connector 100a or 100b is turned over such that the key protrusion 112 is oriented down, it may be inserted into the adapter 200. Therefore, the orientations of the indentations 230 limit the coupling of the connectors 100a and 100b to the predetermined polarity.

However, it is necessary to change the coupling polarity of the connectors for some applications. It means that the indentation 230 of the adapter 200 is positioned up such that the connector 100a or 100b may be inserted into the adapter 200 with its key protrusion 112 being oriented up.

SUMMARY

The present disclosure provides a one-piece optical fiber adapter capable of switching coupling polarity of optical fiber connectors.

In one embodiment, the optical fiber adapter of the present disclosure includes a main body, two first hooks, a first mounting member and a second mounting member. The main body has an accommodation room defined by a first wall, a second wall, a third wall and a fourth wall. The first wall faces the third wall and connects with the second and fourth walls. The accommodation room has opposing first and second openings in an axial direction. A first indentation and a second indentation are respectively formed on the first wall and the third wall within the accommodation room, wherein the first and second indentations are configured to receive a key protrusion of a first optical fiber connector. Two first hooks respectively extend from the second and fourth walls, wherein the first hooks are configured to hook on to the first optical fiber connector. The first mounting member is positioned within the accommodation room of the main body through the first opening. The first mounting member has an accommodation room defined by a fifth wall, a sixth wall, a seventh wall and an eighth wall. The fifth wall faces the seventh wall and connects with the sixth and eighth walls, wherein the accommodation room of the first mounting member has opposing third and fourth openings in the axial direction. A third indentation is formed on the fifth wall to receive a key protrusion of a second optical fiber connector. The first mounting member further includes two second hooks respectively extending from the sixth and eighth walls, wherein the second hooks are configured to hook on to the second optical fiber connector. The second mounting member is mounted to the main body. The second mounting member has an accommodation room defined by a ninth wall, a tenth wall, an eleventh wall and a twelfth wall. The ninth wall faces the eleventh wall and connects with the tenth and twelfth walls, wherein the accommodation room of the second mounting member has opposing fifth and sixth openings in the axial direction. A stop member is formed on the ninth wall, wherein the first and second indentations are configured to receive the stop member.

The foregoing, as well as additional objects, features and advantages of the disclosure will be more readily apparent from the following detailed description, which proceeds with reference to the accompanying drawings.

DETAILED DESCRIPTION OF THE PREFERRED EMBODIMENT

Reference is made to FIGS. 3a to 3d, the optical fiber adapter according to the present disclosure may be an MPO type optical fiber adapter and includes a unitary molded plastic main body 310. The main body 310 is substantially rectangular and has an accommodation room 315 defined by a top wall 311, a bottom wall 312, a right wall 313 and a left wall 314, wherein the top wall 311 faces the bottom wall 312 and connects with the right wall 313 and left wall 314. The accommodation room 315 has opposing first opening 317 and second opening 318 in an axial direction. At least one stop block 322, for example two stop blocks 322 are positioned on the bottom wall 312 within the accommodation room 315, and at least one stop block 321, for example two stop blocks 321 are positioned on the top wall 311 within the accommodation room 315. Each of the stop blocks 321 and 322 has a narrow top surface, a wide bottom surface, an inclined side surface 329 facing the first opening 317 of the accommodation room 315, and a vertical side surface facing the second opening 318 of the accommodation room 315. Two parallel protrusions 331 are formed on the top wall 311 near the second opening 318. Accordingly, an indentation 335 is formed between the protrusions 331, wherein the indentation 335 has a width slightly greater than the width of the key protrusion 112 at the optical fiber connectors 100a, 100b of the FIGS. 1a and 1b. Two parallel protrusions 332 are formed on the bottom wall 312 near the second opening 318. Accordingly, an indentation 336 is formed between the protrusions 332, wherein the indentation 336 has a width slightly greater than the width of the key protrusion 112 at the optical fiber connectors 100a, 100b. A hook 342 is formed on each of the right and left walls 313, 314. The two hooks 342 are positioned to face each other and protrude from the second opening 318 in the axial direction. In one embodiment, the hooks 342 are integrally formed with the right and left walls 313, 314, respectively. A rectangular break 335a extending in the axial direction is formed in the top wall 311 and located in the bottom of the indentation 335. A rectangular break 336a extending in the axial direction is formed in the bottom wall 312 and located in the bottom of the indentation 336. A rectangular recess 337 is formed on the top wall 311 outside the accommodation room 315. The recess 337 is positioned to be in communication with the indentation 335 through the break 335a. A rectangular recess 338 is formed on the bottom wall 312 outside the accommodation room 315. The recess 338 is positioned to be in communication with the indentation 336 through the break 336a. Two rectangular indentations 333 are formed on the top wall 311 outside the accommodation room 315. The indentations 333 are respectively positioned on two opposing sides of the recess 337. Two rectangular indentations 334 are formed on the bottom wall 312 outside the accommodation room 315. The indentations 334 are respectively positioned on two opposing sides of the recess 338.

Figure 4A:
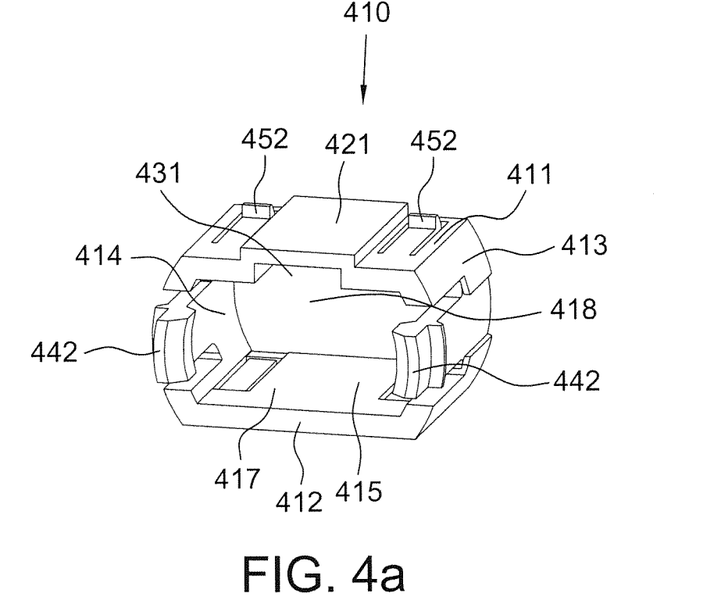
FIGS. 4a and 4b are different elevated perspective views of the first mounting member of the optical fiber adapter of the present disclosure.
Figure 4B:
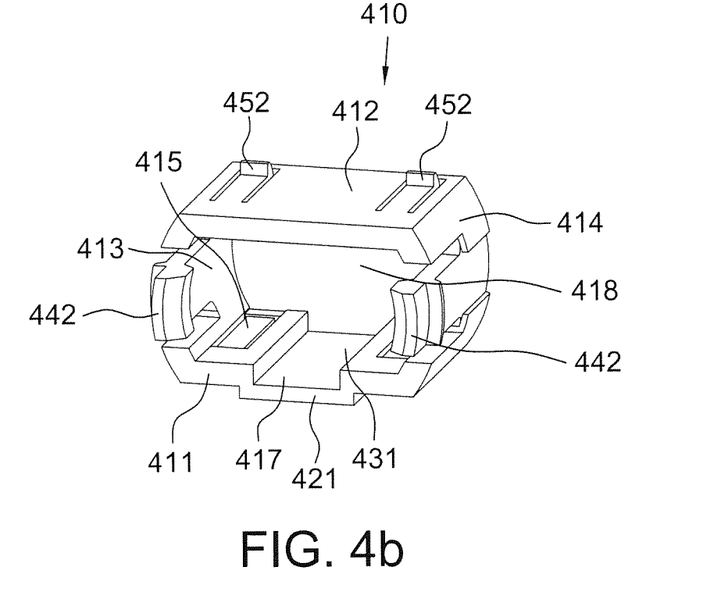

Reference is made to FIGS. 4a and 4b, the optical fiber adapter of the present disclosure further includes a unitary molded plastic first mounting member 410. The first mounting member 410 has an accommodation room 415 defined by a top wall 411, a bottom wall 412, a right wall 413 and a left wall 414, wherein the top wall 411 faces the bottom wall 412 and connects with the right wall 413 and left wall 414. The accommodation room 415 has opposing first opening 417 and second opening 418 in the axial direction. A hook 442 is formed on each of the right and left walls 413, 414. The two hooks 442 are positioned to face each other and protrude from the first opening 417. A rectangular protrusion 421 is formed on the top wall 411 outside the accommodation room 415. A rectangular indentation 431 is formed on the top wall 411 within the accommodation room 415, wherein the indentation 431 has a width slightly greater than the width of the key protrusion 112 at the optical fiber connectors 100a, 100b of the FIGS. 1a and 1b. In addition, at least one elastic hook 452, for example two hooks 452 are formed on each of the top and bottom walls 411, 412. The hooks 452 are positioned to extend backward to the first opening 417.

Figure 5A:
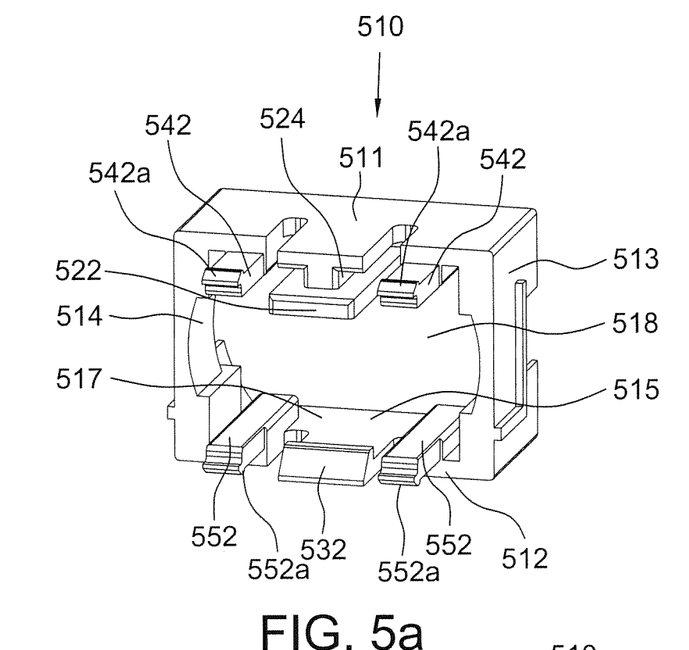
FIGS. 5a and 5b are different elevated perspective views of the second mounting member of the optical fiber adapter of the present disclosure.
Figure 5B:
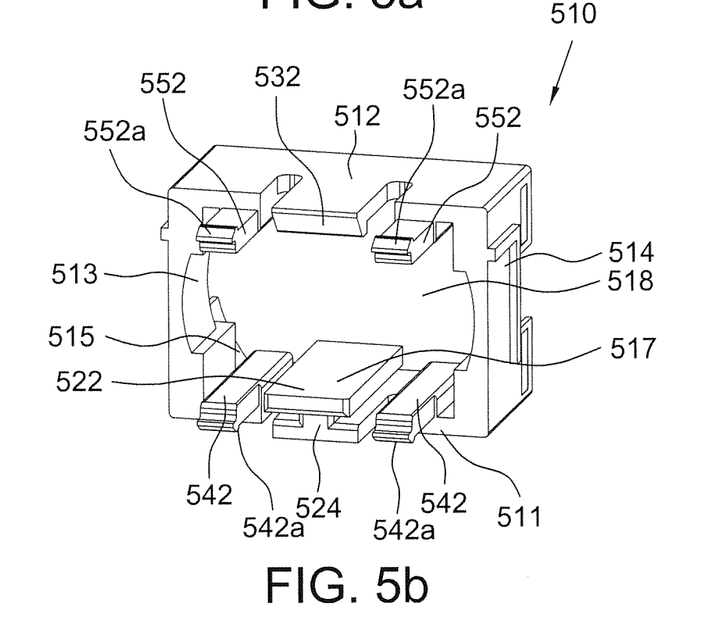

Reference is made to FIGS. 5a and 5b, the optical fiber adapter of the present disclosure still further includes a unitary molded plastic second mounting member 510. The second mounting member 510 has an accommodation room 515 defined by a top wall 511, a bottom wall 512, a right wall 513 and a left wall 514, wherein the top wall 511 faces the bottom wall 512 and connects with the right wall 513 and left wall 514. The accommodation room 515 has opposing first opening 517 and second opening 518 in the axial direction. A rectangular stop member 522 is positioned on the top wall 511 within the accommodation room 515. The stop member 522 has a width slightly smaller than widths of the indentations 335 and 336 such that it may be positioned therein. Located between the stop member 522 and the top wall 511 is an elongated connecting-member 524, which connects the stop member 522 with the top wall 511 to support the stop member 522 to be positioned in place. The connecting member 524 is of rectangular shape, having a width slightly smaller than widths of the breaks 335a and 336a such that it may be positioned therein. The combination of the stop member 522 and connecting-member 524 has a T-shaped cross-section. A hook 532 extends from the bottom wall 512. The hook 532 is positioned to face the stop member 522 and has a width slightly smaller than widths of the recesses 337 and 338. Located on two opposing sides of the stop member 522 are two arms 542. The arm 542 extends out from the first opening 517 and has a bump 542a formed at the front end thereof. The arm 542 has a width slightly smaller than widths of the indentations 333 and 334. Located on two opposing sides of the hook 532 are two arms 552. The arm 552 extends out from the first opening 517 and has a bump 552a formed at the front end thereof. The arm 552 has a width slightly smaller than widths of the indentations 333 and 334.

Figure 6:
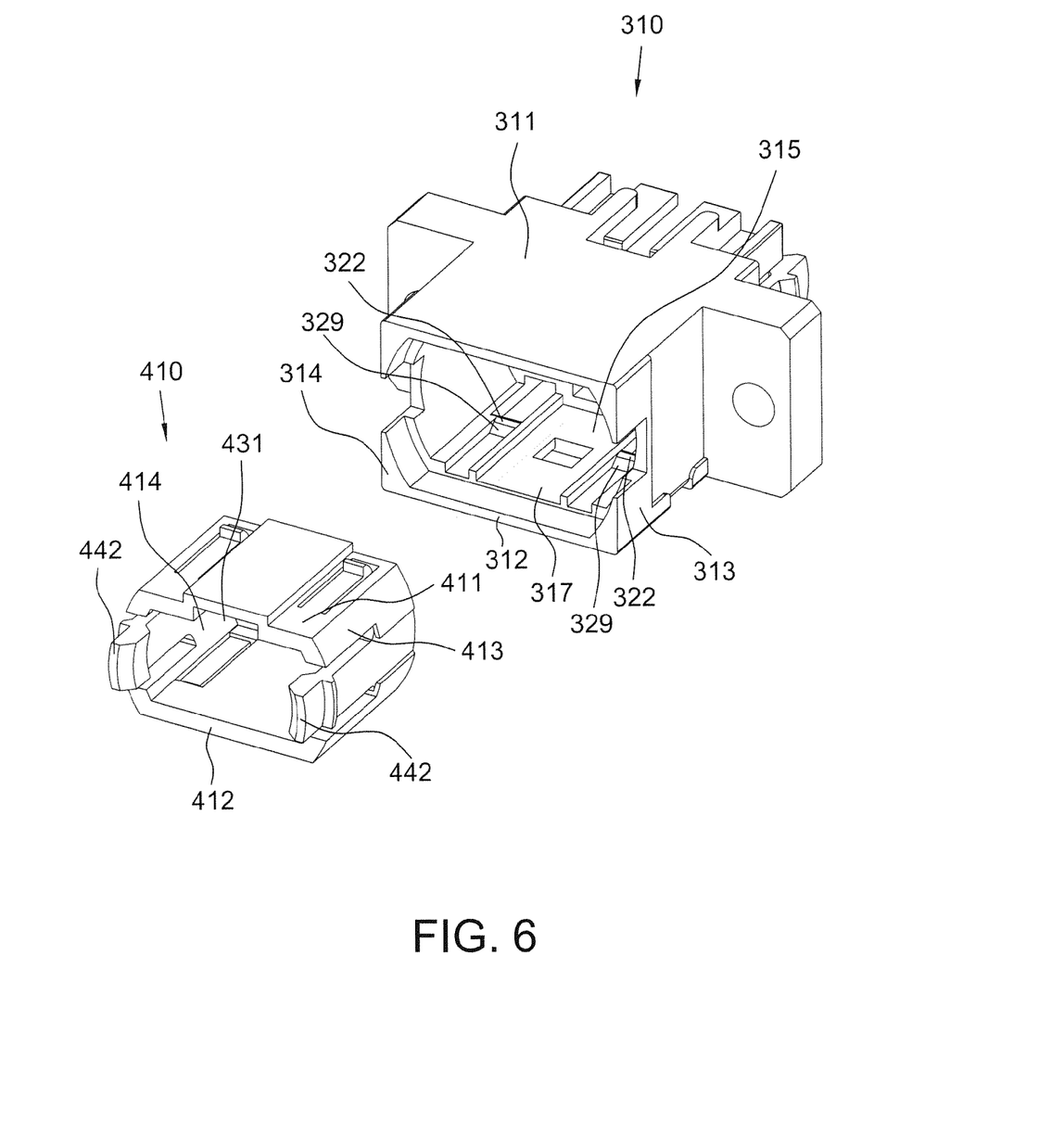
FIG. 6 is an elevated perspective view illustrating the main body and first mounting member of the optical fiber adapter of the present disclosure.
Figure 7:
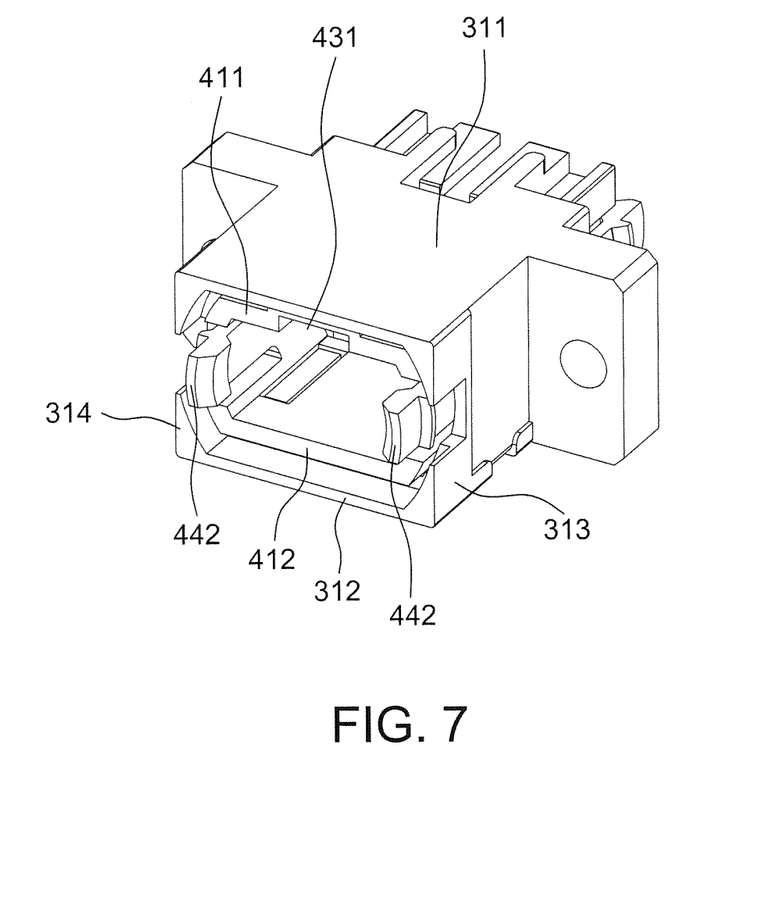
FIG. 7 is an elevated perspective view illustrating that the first mounting member is installed in the main body according to the present disclosure.

Reference is now made to FIG. 6, the method of installing the first mounting member 410 in the main body 310 is to insert the first mounting member 410 into the accommodation room 315 through the first opening 317 with the hooks 442 being positioned backward to the main body 310. According to the method of installing the first mounting member 410 in the main body 310, the first mounting member 410 may be inserted into the main body 310 such that the top wall 411 of the first mounting member 410 is positioned to face the top wall 311 of the main body 310. Alternatively, the top wall 411 may be positioned to face the bottom wall 312 of the main body 310. According to the illustration of FIG. 6, the top wall 411 will face the top wall 311 when the first mounting member 410 is inserted into the main body 310. During the installation, the hooks 452 at the top and bottom walls 411, 412 will confront the stop blocks 321, 322 respectively when the first mounting member 410 continues to be pushed into the main body 310. Since the hooks 452 are elastic, the hooks 452 will be pressed to be deformed by the stop blocks 321, 322 and slide on the inclined side surfaces 329 of the stop blocks 321, 322, respectively when the first mounting member 410 is pushed into the accommodation room 315. FIG. 7 is an elevated perspective view illustrating that the first mounting member 410 has been installed in the main body 310.

Figure 8:
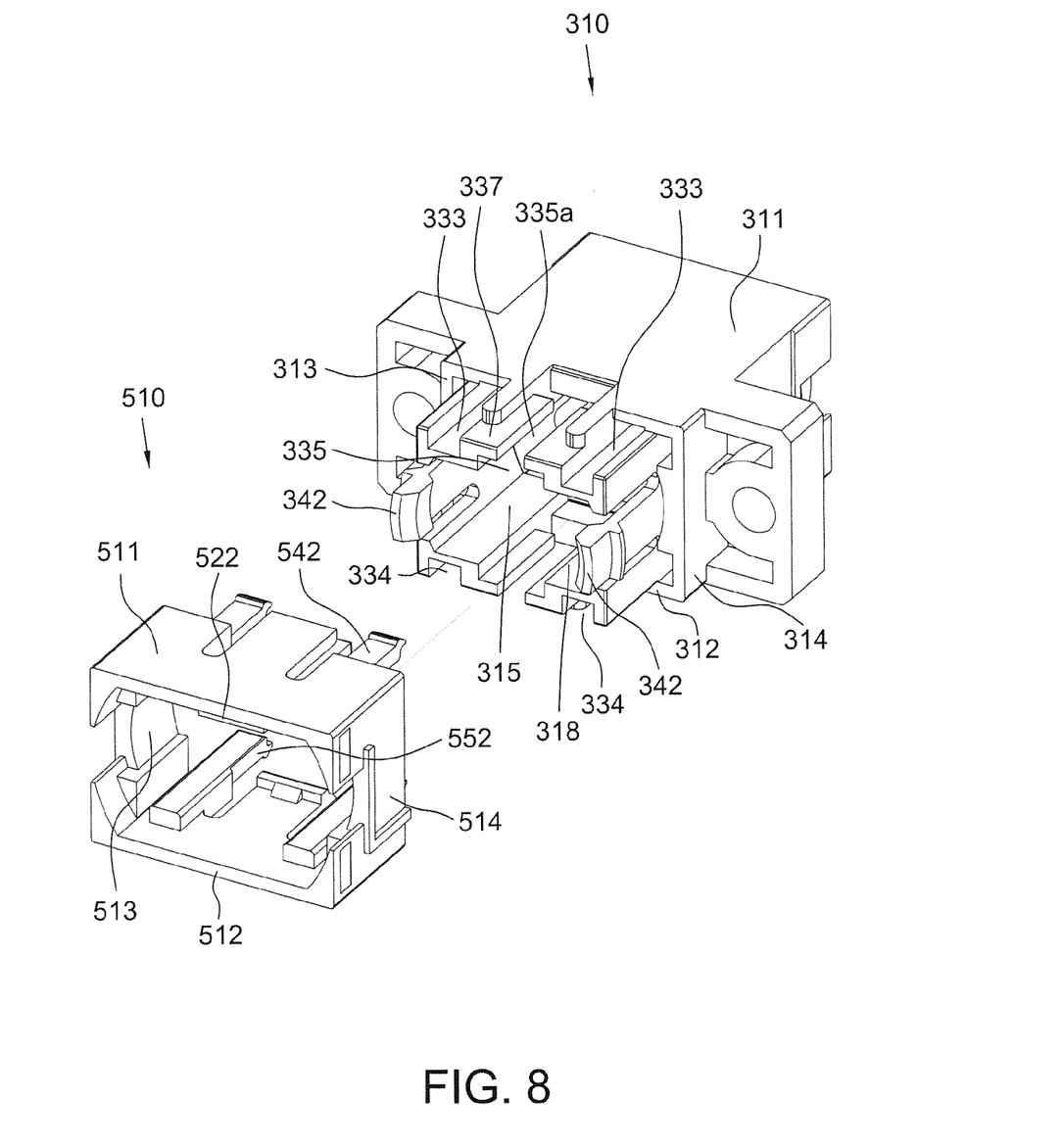
FIG. 8 is an elevated perspective view illustrating the main body and second mounting member of the optical fiber adapter of the present disclosure.

Reference is now made to FIG. 8, the method of installing the second mounting member 510 in the main body 310 is to mount the second mounting member 510 to the main body 310 with the arms 542, 552 being respectively pointed to the indentations 333, 334 at the main body 310. According to the method of installing the second mounting member 510 in the main body 310, the second mounting member 510 may be mounted to the main body 310 such that the top wall 511 of the second mounting member 510 is positioned to face the top wall 311 of the main body 310. Alternatively, the top wall 511 may be positioned to face the bottom wall 312 of the main body 310. According to the illustration of FIG. 8, the top wall 511 will face the bottom wall 312 when the second mounting member 510 is mounted to the main body 310. During the installation, the connecting member 524 will go through the break 335a, the stop member 522 will slide within the indentation 335, and the two arms 542 will respectively slide within the indentations 333. In addition, the hook 532 at the bottom wall 512 will slide within the recess 338 and the two arms 552 will respectively slide within the indentations 334 during the installation. When the second mounting member 510 continues to be pushed into the main body 310 and finally arrives in place, the hook 532 will hook on to the bottom of the recess 338.

Figure 9:
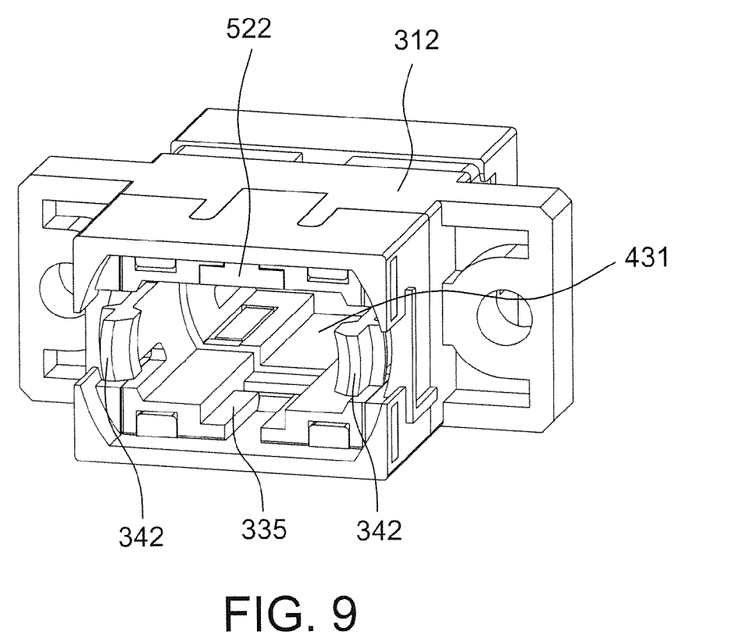
FIG. 9 is an elevated perspective view of the optical fiber adapter according to one embodiment of the present disclosure.
Figure 10:
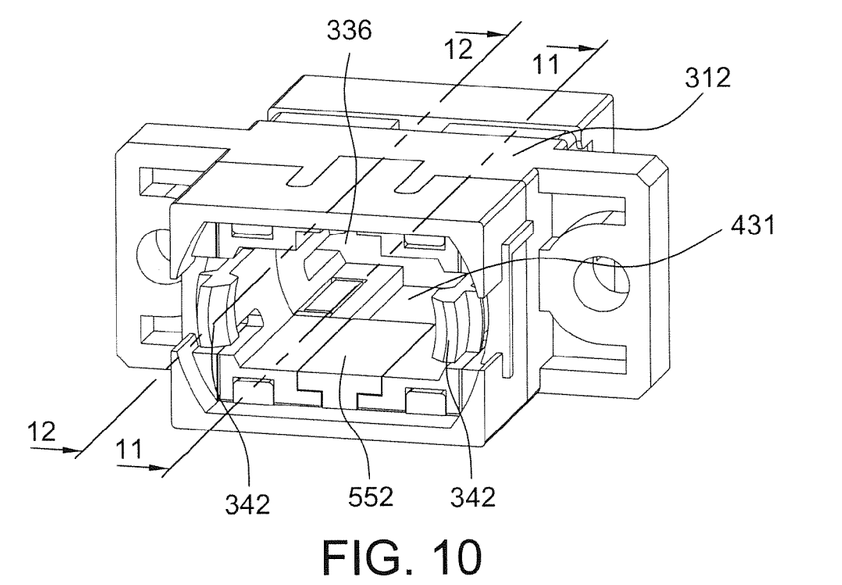
FIG. 10 is an elevated perspective view of the optical fiber adapter according to another embodiment of the present disclosure.

According to the method of installing the first and second mounting members 410, 510 in the main body 310, the indentation 431 at the first mounting member 410 and the empty indentation 335 or 336 that does not receive the stop member 522 of the second mounting member 510 may be positioned at the same side in the accommodation room 315. For example, both empty indentations are positioned at the top wall 311 to face the bottom wall 312 of the main body 310, as shown in FIG. 9. Alternatively, these two empty indentations may be positioned at different sides in the accommodation room 315. One is positioned at the top wall 311 to face the bottom wall 312, and the other is positioned at the bottom wall 312 to face the top wall 311, as shown in FIG. 10.

In operation, the MPO type optical fiber connectors 110a, 110b of FIGS. 1a and 1b are respectively inserted into the accommodation rooms 415 of the first mounting member 410 and the accommodation rooms 515 of the second mounting member 510 through the first and second openings 317, 318 such that the key protrusions 112 at the connectors 110a, 110b are respectively positioned in the indentation 431 of the first mounting member 410 and the empty indentation 335 or 336 at the main body 310. When the connectors 110a, 110b are fully inserted, the hooks 442 at the first mounting member 410 and the hooks 342 at the main body 310 will respectively hook on to the indentations 114 at the connectors 110a, 110b. The guide pins 140 at the connector 110a will be respectively inserted into the guide holes 150 at the connector 110b, and the optical fibers 130 exposed out from the connectors 100a and 100b are brought into contact with each other so that the light from one fiber may be optically coupled to the coupled fiber.

According to the optical fiber adapter of the present disclosure, the stop member 522 may stop the key protrusions 112 at the connectors 110a, 110b from being inserted into the indentation 335 or 336. Accordingly, the connectors 110a, 110b may be inserted into the optical fiber adapter of the present disclosure with only the predetermined orientation. This limits the coupling of the connectors 100a and 100b to the predetermined polarity.

According to the optical fiber adapter of the present disclosure, the coupling polarity of the connectors 100a and 100b may be switched by positioning the stop member 522 of the second mounting member 510 in the indentation 335 or 336 when installing the second mounting member 510 in the main body 310.

According to the optical fiber adapter of the present disclosure, the main body 310 is integrally formed. Therefore, there is no welding line is present at the optical fiber adapter. Furthermore, the optical fiber adapter of the present disclosure has fewer parts and therefore is simpler and easier to assemble.

Figure 11:
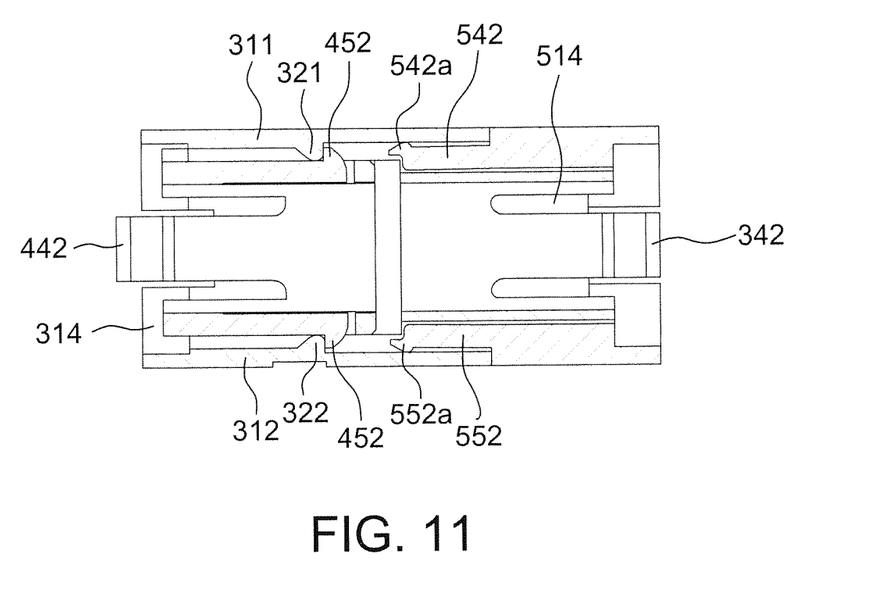
FIG. 11 is a cross-sectional view taken along line 11-11 of FIG. 10.
Figure 12:
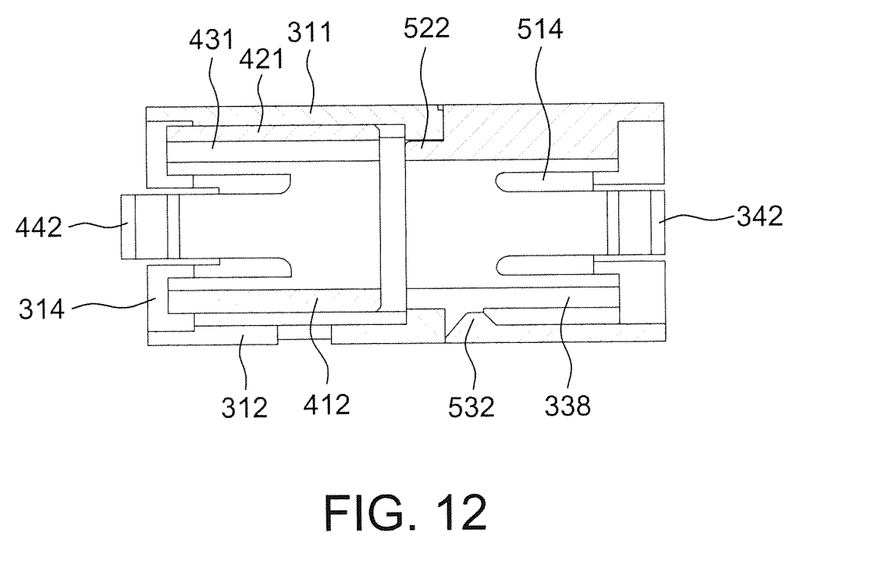
FIG. 12 is a cross-sectional view taken along line 12-12 of FIG. 10.

Reference is made to FIG. 11, a pull at the first mounting member 410 will cause the hooks 452 thereof to hook on to the vertical side surfaces of the stop blocks 321, 322 when the first mounting member 410 is positioned in place in the main body 310. Therefore, this arrangement may prevent the first mounting member 410 from being pulled out of the main body 310 through the first opening 317. Reference is now made to FIG. 12, a pull at the second mounting member 510 will cause the hook 532 thereof to hook on to the bottom of the recess 338 when the second mounting member 510 is mounted to the main body 310. Therefore, this arrangement may prevent the second mounting member 510 from being pulled out of the main body 310. Furthermore, the bumps 542a at the arms 542 press upon the main body 310, for example, respectively upon the top and bottom walls 311, 312 and therefore interference with the main body 310. This may prevent the second mounting member 510 from shaking in the main body 310 due to the assembling tolerance.

Although the preferred embodiments of the disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. An optical fiber adapter, comprising:
a main body having an accommodation room defined by a first wall, a second wall, a third wall and a fourth wall, the first wall facing the third wall and connecting with the second and fourth walls, wherein the accommodation room has opposing first and second openings in an axial direction, a first indentation and a second indentation are respectively formed within the first wall and the third wall and within the accommodation room, wherein the first and second indentations are configured to receive a key protrusion of a first optical fiber connector;
two first hooks respectively extending from the second and fourth walls, wherein the first hooks are configured to hook on to the first optical fiber connector;
a first mounting member being positioned within the accommodation room of the main body, the first mounting member having an accommodation room defined by a fifth wall, a sixth wall, a seventh wall and an eighth wall, the fifth wall facing the seventh wall and connecting with the sixth and eighth walls, wherein the accommodation room of the first mounting member has opposing third and fourth openings in the axial direction, a third indentation is formed within the fifth wall to receive a key protrusion of a second optical fiber connector, the first mounting member further comprising:
two second hooks respectively extending from the sixth and eighth walls, wherein the second hooks are configured to hook on to the second optical fiber connector; and
a second mounting member being mounted to the main body, the second mounting member having an accommodation room defined by a ninth wall, a tenth wall, an eleventh wall and a twelfth wall, the ninth wall facing the eleventh wall and connecting with the tenth and twelfth walls, wherein the accommodation room of the second mounting member has opposing fifth and sixth openings in the axial direction, a stop member is coupled to the ninth wall, wherein the first and second indentations are further configured to receive the stop member;
wherein the first opening is configured for the first mounting member to place within the accommodation room of the main body.

2. The optical fiber adapter as claimed in claim 1, wherein a first break is formed within the first wall and located in a bottom of the first indentation, the first break is positioned to be in communication with the first indentation, a second break is formed within the third wall and located in a bottom of the second indentation, the second break is positioned to be in communication with the second indentation, the second mounting member further comprises a connecting member connecting the stop member with the ninth wall, the first and second breaks are configured to receive the connecting member.

3. The optical fiber adapter as claimed in claim 2, wherein a first recess and a second recess are respectively formed within the first and third walls and outside the accommodation room of the main body, the first recess is positioned to be in communication with the first indentation through the first break, the second recess is positioned to be in communication with the second indentation through the second break, the first and second recesses are configured to receive a part of the ninth wall.

4. The optical fiber adapter as claimed in claim 3, wherein the second mounting member further comprises a fifth hook extending from the eleventh wall, the fifth hook is configured to hook on to a bottom of the first or second recess.

5. The optical fiber adapter as claimed in claim 4, wherein the first and second recesses are further configured to receive a part of the fifth hook.

6. The optical fiber adapter as claimed in claim 1, wherein the second mounting member further comprises:
at least one first arm extending from the ninth wall;
at least one first bump coupled to the at least one first arm to press upon the main body:
at least one second arm extending from the eleventh wall; and
at least one second bump coupled to the at least one second arm to press upon the main body.

7. The optical fiber adapter as claimed in claim 6, wherein the second mounting member comprises two first arms and two second arms, the two first arms are respectively located at two opposing sides of the stop member, and the two second arms are respectively located at two opposing sides of the fifth hook.

8. The optical fiber adapter as claimed in claim 6, wherein at least one fourth indentation is formed within the first wall and outside the main body to receive the at least one first arm, and at least one fifth indentation is formed within the third wall and outside the main body to receive the at least one second arm.

9. The optical fiber adapter as claimed in claim 1, wherein the main body further comprises a first stop block and a second stop block respectively positioned on the first and third walls, the first mounting member further comprises:
a third hook extending from the fifth wall to hook on to the first stop block; and
a fourth hook extending from the seventh wall to hook on to the second stop block.

10. The optical fiber adapter as claimed in claim 9, wherein each of the first and second stop blocks has an inclined side surface facing the first opening of the accommodation room of the main body.

11. The optical fiber adapter as claimed in claim 1, wherein the optical fiber adapter is MPO type.

* * * * *